（12） United States Patent
Woods et al.

(10) Patent No.: US 7,905,931 B2
(45) Date of Patent: Mar. 15, 2011

(54) BIODIESEL PRODUCTION METHOD AND APPARATUS

(75) Inventors: Richard R. Woods, Irvine, CA (US); Brook Porter, Playa Vista, CA (US)

(73) Assignee: Primafuel, Inc., Long Beach, CA (US)

( * ) Notice: Subject to any disclaimer, the term of this patent is extended or adjusted under 35 U.S.C. 154(b) by 373 days.

(21) Appl. No.: 12/027,979

(22) Filed: Feb. 7, 2008

(65) Prior Publication Data

US 2008/0209799 A1    Sep. 4, 2008

Related U.S. Application Data

(60) Provisional application No. 60/900,645, filed on Feb. 9, 2007.

(51) Int. Cl.
C10L 1/08    (2006.01)
C10L 1/19    (2006.01)

(52) U.S. Cl. .................. 44/308; 44/307; 44/385; 44/388

(58) Field of Classification Search ............ 44/385, 44/388, 305, 308
See application file for complete search history.

(56) References Cited

U.S. PATENT DOCUMENTS

| | | | |
|---|---|---|---|
| 2,383,601 A | 8/1945 | Keim | |
| 4,035,271 A | 7/1977 | Nemtsov et al. | |
| 5,320,765 A | 6/1994 | Fetterman et al. | |
| 5,772,013 A | 6/1998 | Kunz et al. | |
| 5,965,032 A | 10/1999 | Frede et al. | |
| 6,129,875 A | 10/2000 | Dassel et al. | |
| 6,284,116 B1 | 9/2001 | Wiese et al. | |
| 6,387,961 B1 | 5/2002 | Schneider et al. | |
| 6,541,228 B1 | 4/2003 | Genders et al. | |
| 6,642,399 B2 | 11/2003 | Boocock | |
| 6,768,015 B1 | 7/2004 | Luxem et al. | |
| 7,109,363 B2 | 9/2006 | Brunner et al. | |
| 7,138,536 B2 | 11/2006 | Bournay et al. | |
| 2005/0274065 A1* | 12/2005 | Portnoff et al. | 44/605 |
| 2006/0021277 A1 | 2/2006 | Petersen et al. | |
| 2006/0074256 A1 | 4/2006 | Alasti et al. | |
| 2006/0094890 A1 | 5/2006 | Sharma et al. | |
| 2007/0158270 A1 | 7/2007 | Geier et al. | |
| 2007/0161095 A1 | 7/2007 | Gurin | |
| 2007/0184541 A1 | 8/2007 | Karl et al. | |
| 2007/0260079 A1 | 11/2007 | Fleisher | |
| 2007/0277429 A1 | 12/2007 | Jackam et al. | |

FOREIGN PATENT DOCUMENTS

DE    10245758    4/2004

(Continued)

OTHER PUBLICATIONS

Lotero, et al., "Synthesis of Biodiesel via Acid Catalysis," Ind. Eng. Chem. Res. 2005, 44, pp. 5353-5363.

(Continued)

Primary Examiner — Ellen M McAvoy
Assistant Examiner — Taiwo Oladapo
(74) Attorney, Agent, or Firm — The Law Office of Joseph M. Kobzeff

(57) ABSTRACT

Methods and apparatus for the production of biodiesel are provided. The methods involve converting a fatty acid rich material to biodiesel using a homogeneous catalyst, followed by electrodialysis of the resulting product to remove the catalyst.

33 Claims, 7 Drawing Sheets

FOREIGN PATENT DOCUMENTS

| WO | WO 2007/071046 | 6/2007 |
|---|---|---|
| WO | WO 2008/006190 | 1/2008 |
| WO | WO 2008/029132 | 3/2008 |

OTHER PUBLICATIONS

Hiwale, et al., "Industrial Applications of Reactive Distillation: Recent Trends," International Journal of Chemical Reactor Engineering, vol. 2: R1 (2004).

Wallberg, et al., "Fractionation and concentration of kraft black liquor lignin with ultrafiltration," Desalination, 2003, vol. 154, pp. 187-199.

International Search Report received in corresponding PCT Application No. PCT/US08/53359.

Written Opinion received in corresponding PCT Application No. PCT/US08/53359.

Jungermann, et al., "Glycerine: A Key Cosmetic Ingredient," table of contents, chapters 2, 3, and 4, New York, (1991).

Ion Exchange, Charles Kickert, Kirk-Othmer Encyclopedia of Chemical Technology, Published Online Dec. 4, 2000, downloaded Jul. 22, 2010 from Http://mrw.interscience.wiley.com/emrw/9780471238966/kirk/article/iondick/a01/current/pdf.

Membrane Technology, Richard W. Baker, Kirk-Othmer Encyclopedia of Chemical Technology, Published Online Aug. 19, 2005, downloaded Jul. 22, 2010 from Http://mrw.interscience.wiley.com/emrw/9780471238966/kirk/article/membbake.a01/current/pdf.

\* cited by examiner

BIODIESEL PRODUCTION METHOD AND APPARATUS

CROSS-REFERENCE TO RELATED APPLICATIONS

This application claims the benefit under 35 U.S.C. §119 (e) of U.S. provisional application Ser. No. 60/900,645, filed Feb. 9, 2007, the disclosure of which is hereby expressly incorporated by reference in its entirety and is hereby expressly made a portion of this application.

FIELD OF THE INVENTION

Methods and apparatus for the production of biodiesel by esterification of fatty acid esters are provided. The methods involve converting a fatty acid rich material to biodiesel using a homogeneous catalyst, followed by electrodialysis of the resulting product to remove the catalyst.

BACKGROUND OF THE INVENTION

Biodiesel is a fuel derived from biologically sourced fatty acids such as fatty acid glycerides or fatty acid esters from lipid containing plant material, microbes, or animals which can be used to replace petroleum derived fuels. Typically, it is blended with petroleum fuels in blends from less than 1 wt. %, known as B1, to pure biodiesel, known as B100.

Commonly, biodiesel is a mono-alkyl ester derived from the processing of vegetable oils and alcohols. The processing is typically carried out by an esterification reaction mechanism, and typically is performed in an excess of alcohol to maximize conversion. Esterification can refer to direct esterification, such as between a free fatty acid and an alcohol, as well as transesterification, such as between an ester and an alcohol. While vegetable oil and alcohols are commonly employed as reactants in esterification reactions, a fatty acid source such as free fatty acids, soaps, esters, glycerides (mono-, di- tri-), phospholipids, lysophospholipids, or amides and a monohydric alcohol source, such as an alcohol or an ester, can be esterified. In addition, various combinations of these reagents can be employed in an esterification reaction.

Vegetable oils include triglycerides and neutral fats, such as triacylglycerides, the main energy storage form of fat in animals and plants. These typically have the chemical structure $C_3H_5(OOCR_x)_3$ where $R_x$ represents a saturated or non-saturated hydrocarbon chain. Different vegetable oils have different fatty acid profiles, with the same or different fatty acids occurring on a single glycerol. For example, an oil can have linoleic, oleic, and stearic acids attached to the same glycerol, with $R_x$ representing all three of these fatty acids. In another example, there can be two oleic acids and one stearic acid attached to the same glycerol, with $R_x$ representing all of these fatty acids. A triglyceride consists of three fatty acids (e.g., saturated fatty acids of general structure of $CH_3(CH_2)_n COOH$, wherein n is typically an integer of from 4 to 28 or higher) attached to a glycerol $(C_3H_5(OH)_3)$ backbone by ester linkages. In the esterification process, vegetable oils and short chain alcohols are reacted to form mono-alkyl esters of the fatty acid and glycerol (also referred to as glycerin). When the alcohol used is methanol ($CH_3OH$), a methyl ester is created with the general form $CH_3(CH_2)_n COOCH_3$ for saturated fatty acids. Typically, but not always, the length of the carbon backbone chain is from 12 to 24 carbon atoms.

The esterification process can be catalyzed or non-catalyzed. Catalyzed processes are categorized into chemical and enzyme based processes. Chemical catalytic methods can employ acid and/or base catalyst mechanisms. The catalysts can be homogeneous and/or heterogeneous catalysts. Homogeneous catalysts are typically liquid phase mixtures, whereas heterogeneous catalysts are solid phase catalysts mixed with the liquid phase reactants, oils and alcohols.

Homogeneous catalysts frequently yield the most effective reactions and fastest reaction rates. The primary disadvantage of the homogeneous catalysts is that downstream processes can be more complex because they must support the isolation and purification of the product to remove the homogeneous catalyst. Two approaches to removing homogeneous catalyst include water washing (mixing with water and separation of the water, or countercurrent contacting with water such as in a column) and resin (or, ion exchange) based purification. Water washing is effective but results in waste water disposal issues and can influence the oxidative resistance of the product biodiesel. The resin based purification methods can also be effective, but the resins are relatively costly and can be costly to regenerate or can result in solid waste disposal issues. Fresh catalyst is generally necessary because water washing and resin based purification do not allow the possibility of recycling catalyst, which increases feedstock costs. The reaction rates of homogeneous catalyst process can be enhanced by increasing the reaction temperatures and pressures. The reaction rates with homogeneous catalysts can also be increased by increasing the intensity of the mixing of the reactants in high sheer reactors.

Heterogeneous catalysts typically have slower reaction rates than homogeneous catalysts because the reactants must diffuse to the catalytic site prior to reacting. They are also subject to poisoning by impurities in the process feeds. The advantage of heterogeneous catalysts is that separation of the catalyst from the reaction products can be simpler, and disposal and purification issues in downstream processes are reduced. Typically, the heterogeneous catalyst is designed to be easily separated by a physical mechanism such as a filter, so that the separated catalyst can be recycled and reused. The heterogeneous catalyst can be fixed in the reactor as a flow through reactor. Performance of recycled catalyst can decrease with time and eventually needs to be replaced. As an alternative to adding heterogeneous catalyst in particle form to the reaction mixture, the surface of the reaction vessel can be treated to have catalytic activity and function as a heterogeneous catalyst. The reaction rates of heterogeneous catalysts can be enhanced by increasing the reaction temperatures, pressures, and mixing.

Non-catalyzed reaction mechanisms use process conditions such as elevated temperatures, elevated pressures and high-sheer mixing to increase the reaction rates and conversion efficiencies. These general approaches are known in the art of chemical processing in the chemical, petroleum and pharmaceutical industries. Generally, as the temperature is increased, the liquid phase reactants change state to a vapor or gaseous stage, which typically decreases the desired homogenous nature of the reaction mixture, and therefore, decreases reaction rates. Because of this, the reaction pressure is typically increased to decrease the vapor formation. However, if the increased temperature leads to vaporization of one or more reagents, the resulting removal of reagent from the reaction mixture can lead to a decrease in the yield and/or reaction rate. Increasing the system pressure can prevent this vaporization and resulting decreases in yield and rate. Typically, the pressure of the reaction is maintained above the vapor pressure of the reagents at the operating temperatures. The temperature and pressure can be taken to a condition known as the critical point, which is the point at which the liquid-vapor phase transition does not exist above the supercritical temperature and pressure. At this point the distinction between liquid and vapor ceases. The critical point for methanol is 512.6K and 79.8 atm and for ethanol is 513.9K and 60.6 atm. The reaction vessels and support equipment necessary to achieve these elevated temperature and pressure conditions can be expensive. While operating at extreme conditions can be desirable in certain respects, when the operating temperature of the reaction or the concentration of catalyst is increased too much, undesirable side reactions or undesirable side-products can result.

SUMMARY OF THE INVENTION

A method of preparing biodiesel using a homogeneous catalyst that avoids one or more of the disadvantages typically associated with homogeneous catalysts is desirable.

Accordingly, in a first aspect a method is provided for producing a biodiesel material, the method comprising conducting an esterification reaction by contacting a feed comprising at least one component selected from the group consisting of a fatty acid, a fatty acid derivative, and combinations thereof, with at least one monohydric alcohol in the presence of a homogeneous catalyst, whereby a reaction mixture comprising at least one ester of the fatty acid and the monohydric alcohol is obtained; subjecting at least a portion of the reaction mixture to a first electrodialysis step, whereby a stream rich in the homogeneous catalyst and a stream depleted in the homogeneous catalyst are obtained, wherein the stream depleted in the homogeneous catalyst is subjected to further processing to yield a biodiesel material; and recycling at least a portion of the stream rich in the homogeneous catalyst to the esterification reaction.

In an embodiment of the first aspect, the fatty acid derivative is a soap.

In an embodiment of the first aspect, the feed comprises an ester of at least one fatty acid and glycerin.

In an embodiment of the first aspect, the feed comprises at least one free fatty acid.

In an embodiment of the first aspect, the monohydric alcohol is a $C_{1-6}$ monohydric alcohol.

In an embodiment of the first aspect, the homogeneous catalyst is a basic homogeneous catalyst.

In an embodiment of the first aspect, the homogeneous catalyst is an acidic homogeneous catalyst.

In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained.

In an embodiment of the first aspect, the weight ratio of homogeneous catalyst in the stream depleted in the homogeneous catalyst to homogeneous catalyst in the reaction mixture being less than or equal to about 30 wt. %, the method further comprises a step of removing from the stream depleted in the homogeneous catalyst at least a portion of the monohydric alcohol present, whereby a stream depleted in homogeneous catalyst and monohydric alcohol is obtained In an embodiment of the first aspect, the weight ratio of homogeneous catalyst in the stream depleted in the homogeneous catalyst to homogeneous catalyst in the reaction mixture being less than or equal to about 30 wt. %, the method further comprises a step of removing from the stream depleted in the homogeneous catalyst at least a portion of the monohydric alcohol present, at least a portion of the alcohol removed is removed by evaporation, whereby a stream depleted in homogeneous catalyst and monohydric alcohol is obtained.

In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained, further comprising separating the stream depleted in homogeneous catalyst and monohydric alcohol into a phase rich in glycerol and a phase depleted in glycerol, and subjecting the phase depleted in glycerol to a purification step, whereby a purified stream comprising at least one monoalkyl ester is obtained.

In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained, further comprising separating the stream depleted in homogeneous catalyst and monohydric alcohol into a phase rich in glycerol and a phase depleted in glycerol, and subjecting the phase depleted in glycerol to a purification step comprising a second electrodialysis step followed by an ionic exchange resin treatment, whereby a purified stream comprising at least one monoalkyl ester is obtained.

In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained, further comprising separating the stream depleted in homogeneous catalyst and monohydric alcohol into a phase rich in glycerol and a phase depleted in glycerol, and subjecting the phase depleted in glycerol to a purification step comprising a second electrodialysis stem followed by an ionic exchange resin treatment conducted in an ionic exchange resin bed, whereby a purified stream comprising at least one monoalkyl ester is obtained.

In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained, further comprising separating the stream depleted in homogeneous catalyst and monohydric alcohol into a phase rich in glycerol and a phase depleted in glycerol, and subjecting the phase depleted in glycerol to a purification step comprising a water-wash process, whereby a purified stream comprising at least one monoalkyl ester is obtained.

In an embodiment of the first aspect, the stream depleted in homogeneous catalyst and monohydric alcohol comprising glycerol and monoalkyl ester, the method further comprises separating the stream depleted in the homogeneous catalyst into a phase rich in glycerol and a phase depleted in glycerol.

In an embodiment of the first aspect, the stream depleted in homogeneous catalyst and monohydric alcohol comprising glycerol and monoalkyl ester, and the weight ratio of homogeneous catalyst in the stream depleted in the homogeneous catalyst to homogeneous catalyst in the reaction mixture being more than or equal to about 10 wt. %, the method further comprises separating the stream depleted in the homogeneous catalyst into a phase rich in glycerol and a phase depleted in glycerol.

In an embodiment of the first aspect, the stream depleted in homogeneous catalyst and monohydric alcohol comprising glycerol and monoalkyl ester, the method further comprises separating by density the stream depleted in the homogeneous catalyst into a phase rich in glycerol and a phase depleted in glycerol.

In an embodiment of the first aspect, the stream depleted in homogeneous catalyst and monohydric alcohol comprising glycerol and monoalkyl ester, the method further comprises separating the stream depleted in the homogeneous catalyst into a phase rich in glycerol and a phase depleted in glycerol and subjecting the phase depleted in glycerol to a purification step, whereby a purified stream comprising at least one monoalkyl ester is obtained.

In an embodiment of the first aspect, the stream depleted in homogeneous catalyst and monohydric alcohol comprising glycerol and monoalkyl ester, the method further comprises separating the stream depleted in the homogeneous catalyst into a phase rich in glycerol and a phase depleted in glycerol and subjecting the phase depleted in glycerol to a purification step comprising a second electrodialysis step followed by an ionic purification step and an alcohol removal step, whereby a purified stream comprising at least one monoalkyl ester is obtained.

In an embodiment of the first aspect, the stream depleted in homogeneous catalyst and monohydric alcohol comprising glycerol and monoalkyl ester, the method further comprises separating the stream depleted in the homogeneous catalyst into a phase rich in glycerol and a phase depleted in glycerol and subjecting the phase depleted in glycerol to a purification step comprising a second electrodialysis step followed by an ionic purification step conducted in an ionic exchange resin bed followed by an alcohol removal step, whereby a purified stream comprising at least one monoalkyl ester is obtained.

In an embodiment of the first aspect, the stream depleted in homogeneous catalyst and monohydric alcohol comprising glycerol and monoalkyl ester, the method further comprises separating the stream depleted in the homogeneous catalyst into a phase rich in glycerol and a phase depleted in glycerol and subjecting the phase depleted in glycerol to a purification step comprising an alcohol removal step followed by a water-wash process, whereby a purified stream comprising at least one monoalkyl ester is obtained.

In an embodiment of the first aspect, the reaction mixture comprising glycerol, the method further comprises separating the reaction mixture comprising at least one ester of the fatty acid and the monohydric alcohol into a portion rich in glycerol and a portion depleted in glycerol, and subjecting the portion depleted in glycerol to the first electrodialysis step.

In an embodiment of the first aspect, the reaction mixture comprising glycerol, the method further comprises separating by density the reaction mixture comprising at least one ester of the fatty acid and the monohydric alcohol into a portion rich in glycerol and a portion depleted in glycerol, and subjecting the portion depleted in glycerol to the first electrodialysis step.

In an embodiment of the first aspect, the method further comprises separating by density the reaction mixture comprising at least one ester of the fatty acid and the monohydric alcohol into a portion rich in glycerol and a portion depleted in glycerol, subjecting the portion depleted in glycerol to the first electrodialysis step, and subjecting the stream depleted in homogeneous catalyst to a purification step, whereby a purified stream comprising at least one monoalkyl ester is obtained.

In an embodiment of the first aspect, the method further comprises separating by density the reaction mixture comprising at least one ester of the fatty acid and the monohydric alcohol into a portion rich in glycerol and a portion depleted in glycerol, subjecting the portion depleted in glycerol to the first electrodialysis step, and subjecting the stream depleted in homogeneous catalyst to a purification step comprising exposure to an ionic exchange resin followed by an alcohol removal step, whereby a purified stream comprising at least one monoalkyl ester is obtained.

In an embodiment of the first aspect, the method further comprises separating by density the reaction mixture comprising at least one ester of the fatty acid and the monohydric alcohol into a portion rich in glycerol and a portion depleted in glycerol, subjecting the portion depleted in glycerol to the first electrodialysis step, and subjecting the stream depleted in homogeneous catalyst to a purification step comprising an alcohol removal step followed by a water-wash process, whereby a purified stream comprising at least one monoalkyl ester is obtained.

In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained, further comprising separating the stream depleted in homogeneous catalyst and monohydric alcohol into a phase rich in glycerol and a phase depleted in glycerol, and subjecting the phase depleted in glycerol to a purification step comprising a second electrodialysis step followed by an ionic exchange resin treatment comprising a hydrogen form cationic resin, whereby a purified stream comprising at least one monoalkyl ester is obtained.

In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained, further comprising separating the stream depleted in homogeneous catalyst and monohydric alcohol into a phase rich in glycerol and a phase depleted in glycerol, and subjecting the phase depleted in glycerol to a purification step, whereby a purified stream containing at least about 98 wt. % monoalkyl ester is obtained.

In an embodiment of the first aspect, the stream depleted in homogeneous catalyst and monohydric alcohol comprising glycerol and monoalkyl ester, the method further comprises separating the stream depleted in the homogeneous catalyst into a phase rich in glycerol and a phase depleted in glycerol and subjecting the phase depleted in glycerol to a purification step, whereby a purified stream containing at least about 98 wt. % monoalkyl ester is obtained.

In an embodiment of the first aspect, the method further comprises separating by density the reaction mixture comprising at least one ester of the fatty acid and the monohydric alcohol into a portion rich in glycerol and a portion depleted in glycerol, subjecting the portion depleted in glycerol to the first electrodialysis step, and subjecting the stream depleted in homogeneous catalyst to a purification step, whereby a purified stream containing at least about 98 wt. % monoalkyl ester is obtained In an embodiment of the first aspect, the method further comprises a step of removing from the stream depleted in the homogeneous catalyst at least a portion of the monohydric alcohol present, whereby a stream depleted in homogeneous catalyst and monohydric alcohol is obtained, further comprising separating the stream depleted in homogeneous catalyst and monohydric alcohol into a phase rich in glycerol and a phase depleted in glycerol, and subjecting the phase depleted in glycerol to a purification step, whereby a purified stream comprising at least one monoalkyl ester and less than about 1 wt. % glycerol and less than about 0.5 wt. % sulfated ash as determined by ASTM D874 is obtained.

In an embodiment of the first aspect, the stream depleted in homogeneous catalyst and monohydric alcohol comprising glycerol and monoalkyl ester, the method further comprises separating the stream depleted in the homogeneous catalyst into a phase rich in glycerol and a phase depleted in glycerol and subjecting the phase depleted in glycerol to a purification step, whereby a purified stream comprising at least one monoalkyl ester and less than about 1 wt. % glycerol and less than about 0.5 wt. % sulfated ash as determined by ASTM D874 is obtained.

In an embodiment of the first aspect, the method further comprises separating by density the reaction mixture comprising at least one ester of the fatty acid and the monohydric alcohol into a portion rich in glycerol and a portion depleted in glycerol, subjecting the portion depleted in glycerol to the first electrodialysis step, and subjecting the stream depleted in homogeneous catalyst to a purification step, whereby a purified stream comprising at least one monoalkyl ester and less than about 1 wt. % glycerol and less than about 0.5 wt. % sulfated ash as determined by ASTM D874 is obtained.

BRIEF DESCRIPTION OF THE DRAWINGS

Preferred embodiments will be described with reference to certain drawings. The drawings described are only schematic and are non-limiting. In the drawings, the size of some of the elements may be exaggerated and not drawn to scale for illustrative purposes. The dimensions and the relative dimensions do not correspond to actual dimensions.

DETAILED DESCRIPTION OF THE PREFERRED EMBODIMENT

Figure 1:
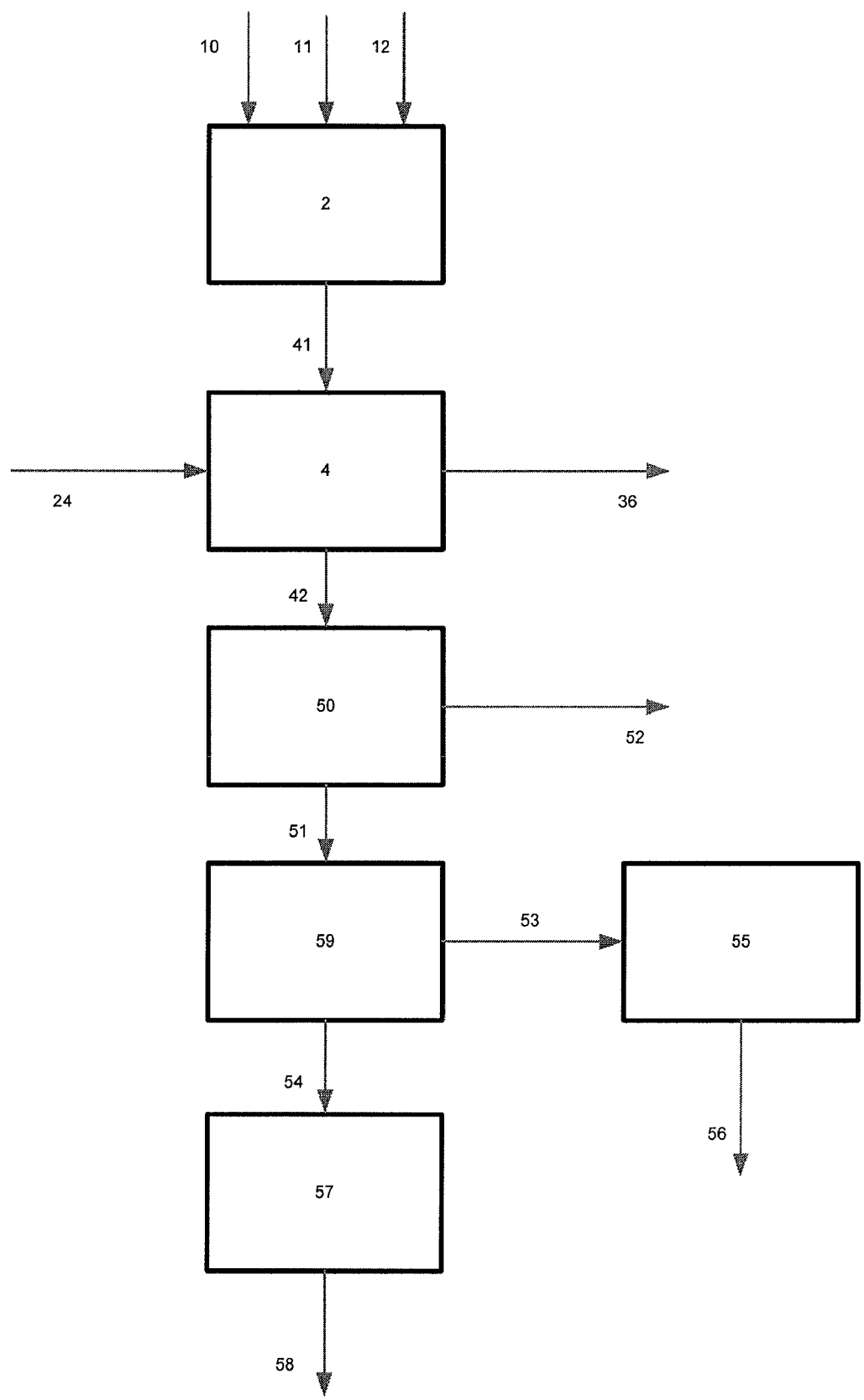
FIG. 1 is a block diagram illustrating a process for producing biodiesel product which utilizes electrodialysis after an esterification reaction step.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Conversion of Fatty Acid Glycerides to Biodiesel Material

In one embodiment, a process for converting fatty acid glycerides, such as vegetable oil, to biodiesel product is provided. Biodiesel most frequently comprises a mixture of esters of fatty acids and monohydric alcohols. Typical fatty acids employed in the production of such esters include, but are not limited to linoleic, oleic, stearic, palmitic, palmitoleic, and linolenic acids. Other fatty acids as are well known in the art can also be used in biodiesel, for example, the natural fatty acids derived from plant and animal sources which commonly have a chain length of 4 to 28 carbons (usually unbranched and even numbered), and which can be saturated or unsaturated. While natural fatty acids are typically preferred, any suitable fatty acid can be employed. Typical monohydric alcohols include, but are not limited to methanol, ethanol, 1-propanol, 2-propanol, 1-butanol, 2-butanol, t-butanol, and alcohols with longer carbon chains. The $C_{1-4}$ monohydric alcohols are generally preferred; however $C_{5-6}$ monohydric alcohols can also be employed. While pure monohydric alcohols are preferred, small amounts of polyhydric alcohols can also be present, although it is generally preferred to minimize the amount of such alcohols.

A common source of fatty acids for biodiesel production is fatty acid glycerides and fatty acid wax esters from plant or animal sources. Such materials include the triacylglyceride rich materials of vegetable oil (for example, corn oil, linseed oil, palm oil, palm kernel oil, soybean oil, rapeseed oil) and animal fat (for example, lard, tallow, fish oil). Partial glycerides, such as monoacyl glycerides, diacyl glycerides can also be used as well as phospholipids and lysophospholipids. Combinations of these materials can also be employed. Free fatty acids may also be present in the fatty acid source.

The fatty acid material is reacted with the monohydric alcohol in the presence of a catalyst. Where the fatty acid is present as a triacyl glyceride, the conversion occurs through an esterification process.

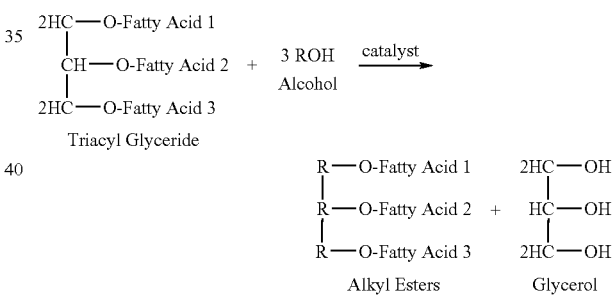

The esterification reaction can also involve free fatty acids.

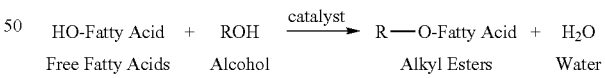

A mixture that includes both free fatty acids and partial glycerides and/or triacyl glycerides can also be used as a starting material in a transesterification reaction, e.g., crude vegetable oils or oils of marginal quality, such as those that are not destined for food use. Generally, such oils are more difficult to process with basic homogeneous catalysts because the free fatty acids can neutralize the base in a simple acid-base reaction to produce soaps. When this reaction takes place, the reacted base is no longer available to serve as a catalyst in the esterification reaction and the soap is frequently not esterified and results in processing losses. In some situations, addition of more basic catalyst to replace the portion that was neutralized can in combination with the water present produce more free fatty acids and further neutralization of catalyst. One approach for esterifying such a mixture involves a first esterification of the free fatty acids with available hydroxyl groups on glycerol or glycerides, followed by esterification with a monohydric alcohol. Optionally, water removal can be conducted between the reaction steps. Other approaches include increased use of catalyst to overcome any neutralization that takes place and increasing the amount of alcohol present to reduce water activity and shift the equilibrium to favor the transesterification reaction, or refinement of the oil to remove the free fatty acids. However these approaches may result in increased costs, losses and/or additional processing steps.

In addition to problems with the neutralization of such fatty acid(s), there are also potential processing difficulties presented by the generation of water from the esterification of the free fatty acids and, in some cases, the neutralization of the fatty acid itself, such as when the free fatty acid reacts with hydroxide ion. The presence of water increases the risk of the formation of emulsions which can interfere with gravity or density separation techniques such as settling, liquid-liquid contacting, liquid-liquid separation and centrifugation, and hydrocycloning.

Much research and numerous patents have been directed toward addressing the problem of free fatty acids present in the feedstock for esterification. For example, in U.S. Pat. No. 2,383,601, a method is described wherein the high free fatty acid oil or fat is first refluxed with acid and alcohol and then refluxed with base and alcohol. In U.S. Pat. No. 7,109,363 a method is described wherein the high free fatty acid oil or fat is esterified under acid conditions and then washed with the glycerol byproduct of a base-catalyzed esterification process.

In the production of fatty acid esters, the esterification reaction that takes place, whether direct esterification or transesterification, can be catalyzed or non-catalyzed. When no catalyst is present, higher temperatures and pressures are needed. Suitable catalysts include bases, such as hydroxyl ions and alkoxy ions, and acids, such as hydrochloric and sulfuric. Other catalysts include basic ion exchange resins and acidic ion exchange resins. Catalysts that are dissolved in the reaction mixture are generally described as homogeneous and those that are not dissolved are generally described as heterogeneous.

The esterification reaction, whether direct esterification or transesterification, is equilibrium controlled. As a result, the amount of alkyl ester product that is present at the end of the reaction depends upon the amount of alcohol and the amount of various reaction products, such as glycerol and water, present. In the transesterification of triacylglycerides, if the amount of monohydric alcohol is limited, less product ester is formed. Frequently, these reactions are conducted in the presence of excess amounts of monohydric alcohols, resulting in higher yields of alkyl esters. Similarly, if the excess alcohol is removed at the end of the reaction, the reaction can be reversed with the product esters reacting with the glycerol to produce fatty acid glycerides. This reverse reaction can lead to reduced yields and higher production costs. However, if the residual monohydric alcohol is not removed prior to separating the fatty acid ester product from the glycerol, it will generally need to be removed from the glycerol stream and the biodiesel stream, leading to higher operating and capital costs. Since the monohydric alcohol is soluble in both the biodiesel and the glycerol streams, the separation step can be slower, requiring longer residence times and/or enhanced separation (e.g., by applied forces such as centrifugation). Reactions that utilize heterogeneous catalysts can be slowed or suppressed to limit the reverse reaction by simply removing the catalyst, such as by filtration, centrifugation or settling. However, these methods are not able to remove a homogeneous catalyst. As a result, a typical biodiesel process employs a (trans)esterification step, followed by temperature and pressure reduction step, followed by separation of biodiesel and glycerol, followed by reheating of the biodiesel product and monohydric alcohol recovery, and finally a catalyst removal and purification step.

Methods for removing homogeneous catalysts, such as water washing and direct adsorption on ion exchange resin, present other issues that generally make them less than ideal for biodiesel production. Removal of a homogeneous catalyst by water washing introduces water, which can require additional separation steps to remove the water from the product. Other issues include emulsion formation and dilution of the residual alcohol (which may require attention prior to recycling the alcohol), and product stability issues related to the presence of water in the product. Processes utilizing water washing may limit plant siting to locations that have abundant water, thus limiting their usefulness.

Complete removal of homogeneous catalyst by ion exchange can be expensive because of the high catalyst loading required, which leads to high resin use. The high affinity of such strong base to the resin also limits the possibilities for regeneration of the resin.

It has now been discovered that an electrodialysis step, as taught herein in various embodiments, can be employed to recapture homogeneous catalyst, suppress the reverse esterification reaction, allow removal of residual alcohol from a single stream prior to glycerol removal, minimize energy requirements for reheating, and reduce emulsion formation downstream in processing steps. An electrodialysis step may also reduce process sensitivity to free fatty acids in the feedstock.

Downstream of the reaction step, a process is employed to isolate the biodiesel product from the other components of the reaction mixture. In various embodiments, separation and purification of other components of the reaction mixture can optionally be performed as well. The specific methods can be selected based on the product purity desired and the nature of the separation steps already performed. Various techniques such as water washing, gravity separation, centrifugation, absorption, adsorption, evaporation, distillation, electric field techniques and membrane methods as well as combined techniques such as pervaporation and electrodialysis can be employed alone or in combination.

An electrodialysis step can be performed on the reaction mixture, prior to separation of the mixture into an alkyl ester phase and a glycerol phase. This initial electrodialysis step suppresses the reverse reaction by reducing the amount of homogenous catalyst from the reaction step, and as a result, the reaction mixture does not need to be cooled and allows higher processing temperatures of the alkyl ester and glycerol mixture for the removal of residual alcohols without substantially reducing the yield of alkyl esters. The initial removal of alcohols and the use of higher operating temperatures allow for a cleaner separation of the alkyl ester phase from the glycerol phase because the monohydric alcohol is removed from both phases prior to separation. Removal of the alcohols simultaneously with reduction of the amount of water present in the system, such as by evaporation, distillation, flashing, or the like, also reduces the likelihood of emulsion formation in downstream process steps and further facilitates the alkyl ester-glycerol separation.

The combination of recapturing catalyst for reuse and facilitating water removal, such as by co-removal with alcohol, allows the processing of feedstock with higher free fatty acid content, such as crude, old, abused, mishandled, contaminated, unrefined or partially refined oils in a cost effective manner and in a manner that is less sensitive/more transparent to the free fatty acid levels. In one embodiment, a basic homogeneous catalyst level is selected that provides sufficient base to neutralize a range of free fatty acid levels and still catalyze the reaction. The base/catalyst can be added in portions or all at once. Water and/or alcohol can be removed, such as by evaporation or other means, before, during, or after this addition. In some embodiments, base/catalyst sufficient to neutralize at least a portion of the free fatty acids present can be added followed by water and/or alcohol removal, and then by addition of more base/catalyst. In other embodiments, the base/catalyst can be added in only one step followed by water and/or alcohol removal. In other embodiments, the base/catalyst is added, in portions or all at once, without removal of water and/or alcohol. In other embodiments, the base/catalyst is recycled by the electrodialysis unit and the water can be removed with the alcohol prior to it presenting a risk of forming an emulsion. In some embodiments, acid homogeneous catalyst can be used in an esterification reaction, which is especially preferred when the feedstock has a high free fatty acid concentration. The acid catalyst supports the conversion of the free fatty acids into alkyl ester in the presence of monohydric alcohols, and the esterification of the free fatty acids to available sites on glycerol and glycerides. The reaction product mixture that can contain alkyl esters, nonreacted triglycerides, partially reacted glycerides, monohydric alcohols, acid catalyst, and water can then be processed by electrodialysis, which effectively removes most of the acid catalyst and water present, along with some monohydric alcohols. The water can be removed from the mixture and the acid and alcohols can be reused in the esterification reaction. The glycerides, alkyl esters, and monohydric alcohol mixture remaining have only trace amounts of acid catalyst and water, and this mixture can be neutralized, if necessary, and passed to downstream basic catalyst transesterification reactions, or if the conversion to alkyl esters was sufficient, to the separation and purification steps of the process. Overall, this approach advantageously minimizes the formation of soaps and decreases the basic catalyst requirements and inefficiency related to water concentrations.

While the electrodialysis step is preferably performed prior to the step of separating the glycerol and alkyl ester phases, substantial benefits can be obtained by performing electrodialysis at other locations in the process as well. In various embodiments, the electrodialysis is performed on the alkyl ester material after it is separated from the glycerol. Alternatively, electrodialysis can be performed on the glycerol material after separation of the alkyl esters, or in a combination with other electrodialysis steps performed on other products. The degree of benefit of additional electrodialysis steps in the process is dependent upon the efficiency of the initial steps and the desired purity of the resulting product (e.g., purified products versus crude products). As illustrated below, each of these methods provides, to varying degrees, the benefits associated with electrodialysis.

The biodiesel product of the reaction step is isolated from the other components of the reaction mixture. In various embodiments, separation and purification of other components of the reaction mixture can be performed as well. The specific methods employed depend on the particular purity desired and the separation steps already performed or contemplated for downstream use. Various techniques such as water washing, gravity separation, centrifugation, absorption, adsorption, evaporation, distillation, electric field techniques and membrane methods as well as combined techniques such as pervaporation and electrodialysis can be employed alone or in combination.

FIG. 1 depicts schematically a process for producing a biodiesel product from fatty acid glycerides. A fatty acid glyceride rich material 10, a monohydric alcohol 11, and a homogeneous catalyst 12, are combined in a reactor 2. The reaction mixture 41, including alkyl ester product, glycerol, catalyst, monohydric alcohol and side products, is then subjected to an electrodialysis step 4. The purge stream 24, containing monohydric alcohol takes up at least a portion of the catalyst from the reaction mixture 41 into a catalyst rich concentrate stream 36. Residual monohydric alcohol is then removed from the depleted reaction mixture 42 in the alcohol separator 50, resulting in an alcohol rich material 52, and an alcohol depleted material 51. The alcohol depleted material 51 is then separated into a heavy phase 54 including glycerol and a light phase 53 including alkyl esters with a separator 59. The light phase 53 is then optionally subjected to a further purification in purification step 55 to further purify the alkyl esters. The heavy phase 54 is then optionally subjected to further purification in purification step 57. The purified biodiesel material 56 can be used as a motor fuel or for other purposes, stored, or further processed as needed. The purified glycerol material 58 can be further processed, stored, and/or used as needed.

Feed Materials

As discussed above, the fatty acid rich material can be derived from plant, animal, microbial, or other sources. Preferred sources include vegetable oils such as corn, soy, rapeseed, canola, sunflower, palm and other oils that are readily available; however, any vegetable oil or animal fat can be employed. Raw or unrefined oil can be used in certain embodiments; however, filtered and refined oils are typically preferred. Use of degummed and filtered feedstock minimizes the potential for emulsification and blockage in the reactors. Feedstock with high water content can be dried before basic catalyst processing. Feedstock with high free fatty acid content can be passed through an esterification process to reduce the free fatty acid content before the process of esterification to convert fatty acid glycerides to monoalkyl esters. The reduction of free fatty acids and the conversion of fatty acid glycerides can also in the same processing step. Feedstock containing other organic compounds (such as hexane, heptane, isohexane, etc.) can typically be processed without significant modifications to the reactor. Other materials containing fatty acid glycerides or other fatty acid esters can also be employed, including phospholipids, lysophospholipids, and fatty acid wax esters. The feed material used typically includes a mixture of fatty acids. For example, the fatty acid profiles of several potential feedstocks are shown in Table 1. The feed can also include a mixture of fatty acid glycerides from different sources. The free fatty acid content of the vegetable oil is preferably about 0.1 wt. % or less when employed in a basic homogeneous catalyst esterification reaction. Higher levels can be utilized as well, and levels up to about 3 wt. %, or even as high as 15 wt. % or more can typically be tolerated; however vegetable oils with such free fatty acid levels typically exhibit low alkyl ester yields if not preprocessed in an esterification reactor. The free fatty acid content of the feed oil can be measured and this value employed in determining the amount of catalyst and/or alcohol employed in reaction step 2. In some embodiments, the feed oil is pretreated with the addition of base or basic catalyst to at least partially neutralize the free fatty acids. In other embodiments, the reaction conditions, including the concentrations of oil, alcohol, and catalyst, are selected to provide sufficient materials to accommodate a variety of free fatty acid contents. In other embodiments, the degree of reaction that occurs in the reactor and the composition of the reaction mixture 41 can be monitored for pH, free fatty acid content and water, so as to permit adjustment of the amount of one or more feed materials added to the reaction step 2. The oil can optionally be pretreated to remove or esterify free fatty acids or water, or the oil can optionally be pretreated to reduce polar lipids. While specific oils are discussed herein with reference to certain embodiments and examples, the preferred embodiments are not limited to such specific oils. Other suitable oils and feedstocks can also be employed in the preferred embodiments.

TABLE 1

Fatty Acid Profile of Several Typical Feed Oils

| Fatty Acid | Palm Oil | Soy Oil | Hi Oleic Rapeseed | Yellow Grease |
|---|---|---|---|---|
|  | 0 wt. % | 0 wt. % | 0 wt. % | 0 wt. % |
| C6:0 | 0 wt. % | 0 wt. % | 0 wt. % | 0 wt. % |
| C8:0 | 0 wt. % | 0 wt. % | 0 wt. % | 0 wt. % |
| C10:0 | 0 wt. % | 0 wt. % | 0 wt. % | 0 wt. % |
| C12:0 | 0 wt. % | 0 wt. % | 0 wt. % | 0 wt. % |
| C14:0 | 1 wt. % | 0 wt. % | 0 wt. % | 2 wt. % |
| C16:0 | 44 wt. % | 7 wt. % | 4 wt. % | 23 wt. % |
| C18:0 | 5 wt. % | 5 wt. % | 1 wt. % | 13 wt. % |
| C18:1 | 39 wt. % | 28 wt. % | 60 wt. % | 44 wt. % |
| C18:2 | 10 wt. % | 53 wt. % | 21 wt. % | 7 wt. % |
| C18:3 | 0 wt. % | 0 wt. % | 13 wt. % | 1 wt. % |
| C20:0 | 0 wt. % | 0 wt. % | 0 wt. % | 0 wt. % |
| C22:1 | 0 wt. % | 0 wt. % | 0 wt. % | 0 wt. % |
| Misc. | 1 wt. % | 8 wt. % | 0 wt. % | 9 wt. % |
| Total | 100 wt. % | 100 wt. % | 100 wt. % | 100 wt. % |

The catalyst employed in preferred embodiments is preferably a strongly basic homogeneous catalyst, although acidic catalysts can also be employed. Strong bases include alkali metal hydroxides, such as potassium hydroxide (KOH) and sodium hydroxide (NaOH), as well as alkoxides such as sodium methoxide, sodium ethoxide, sodium propoxide, potassium methoxide, potassium ethoxide, potassium propoxide, lithium methoxide, lithium ethoxide, lithium propoxide, and other combinations of alkali metals and/or alkaline earth metals with alcohols. A typical feed concentration of sodium methoxide for storage and addition is about 25 wt. % in methanol solution, but concentrations as low as 2 to 4 wt. % can also be employed in certain embodiments. Strong acid catalysts including sulfuric acid, phosphoric acid, hydrochloric acid, and other available acids, which can be mixed with monohydric alcohols, are also acceptable. Particularly preferred basic catalysts include alkali metal alkoxides, such as those generated by the addition of alkali metal hydroxides or alkali metals to alcohols; however, other strong bases can be used as well. When an alkoxide is employed in the reaction, it can be prepared separately and then added to the reaction mixture, such as by adding sodium or potassium metal or NaOH or KOH to all or a portion of the alcohol employed in the reaction. Alternatively, the alkoxide can be generated in the reaction mixture, such as by addition of NaOH, KOH, sodium metal or potassium metal to the reaction vessel with alcohol added prior to, subsequently, or concurrently. The base can also be added to one of the other feed material prior to its addition to the reactor. While specific acid and base homogeneous catalysts are discussed herein with reference to certain embodiments and examples, the preferred embodiments are not limited to such specific homogeneous catalysts. Other suitable homogeneous catalysts can also be employed in the preferred embodiments.

The alcohol employed in the esterification and/or transesterification reactions is preferably a low molecular weight monohydric alcohol such as methanol, ethanol, 1-propanol, 2-propanol, 1-butanol, 2-butanol, or t-butanol. The alcohol is preferably anhydrous; however, a small amount of water in the alcohol may be present (e.g., less than about 2 wt. %, preferably less than about 1 wt. %, and most preferably less than about 0.5 wt. %; however in certain embodiments higher amounts can be tolerated). Acid esterification reactions are more tolerant of the presence of small amounts of water in the alcohol than are basic transesterification reactions. While specific monohydric alcohols are discussed herein with reference to certain embodiments and examples, the preferred embodiments are not limited to such specific monohydric alcohols. Other suitable monohydric alcohols can also be employed in the preferred embodiments.

Esterification Reaction

The rate and extent of reaction for esterification of the fatty acid glycerides or other fatty acid derivates with monohydric alcohol in the presence of a catalyst depends upon factors including but not limited to the concentration of the reagents, the concentration and type of catalyst, and the temperature and pressure conditions, and time of reaction. The reaction generally proceeds at temperatures above about 50° C., preferably at temperatures above 65° C.; however, the catalyst selected or the amount of catalyst employed can affect this temperature to some extent.

Higher temperatures generally result in faster reaction rates. However, the use of very high temperatures, such as those in excess of about 300° C., or even those in excess of 250° C., can lead to increased generation of side products, which can be undesirable as their presence can increase downstream purification costs. Higher temperatures can be advantageously employed, however, e.g., in situations where the side products do not present an issue.

The reaction temperature can be achieved by preheating one or more of the feed materials or by heating a mixture of the feed materials. Heating can be achieved using apparatus known in the art e.g., heat exchangers, jacketed vessels, submerged coils, and the like. While specific temperatures and methods of obtaining the specific temperatures are discussed herein with reference to certain embodiments and examples, the preferred embodiments are not limited to such specific temperatures and methods of obtaining the specific temperatures. Other temperatures and methods of obtaining temperatures can also be employed in the preferred embodiments.

The amount of alcohol employed in the reaction is preferably in excess of the amount of fatty acid present on a molar basis. The fatty acid can be free or combined, such as to alcohol, glycol or glycerol, with up to three fatty acid moieties being attached to a glycerol. Additional amounts of alcohol above stoichiometric provide the advantage of assisting in driving the equilibrium of the reaction (depicted in Equation 1 above) to produce more of the fatty acid ester product. However, greater excesses of alcohol can result in greater processing costs and larger capital investment for the larger volumes of reagents employed in the process, as well as greater energy costs associated with recovering, purifying, and recycling this excess alcohol. Accordingly, it is generally preferred to employ an amount of alcohol yielding a molar ratio of alcohol to fatty acid of from about 15:1 to about 1:1 (stoichiometric), and more preferably from about 4:1 to about 2:1; however the process can operate over a much wider range of alcohol to fatty acid ratios, with nonreacted materials subjected to recycling or other processing steps. Generally, lower relative levels of alcohol to fatty acid result in decreased yield and higher relative levels of alcohol levels to fatty acid result in increased capital and operating expense. Some instances of operation at ratios of alcohol to fatty acid over a wider range include when first starting up the process or shutting down the process, when balancing the throughput of the reactor to other processing steps or other processing facilities, such as one that produces alcohol or utilizes a side stream, or when process upsets occur. When a molar ratio of 2:1 methanol to fatty acid is employed and a sodium hydroxide concentration of about 0.5 wt. % of the total reaction mixture is employed, the ratio of sodium hydroxide to methanol is about 2 wt. % entering the reactor and about 4 wt. % at the exit because about half of the alcohol is consumed in the esterification reaction.

Similarly, higher amounts of catalyst generally result in faster reactions. However, higher amounts of catalyst can lead to higher downstream separation costs and a different profile of side reaction products. The amount of homogeneous catalyst is preferably from about 0.2 wt. % to about 1.0 wt. % of the reaction mixture when the catalyst is sodium hydroxide; at typical concentration of 0.5 wt. % when a 2:1 molar ratio of methanol to fatty acid is used; however, in certain embodiments higher or lower amounts can be employed. The amount of catalyst employed can also vary depending upon the nature of the catalyst, feed materials, operating conditions, and other factors. Specifically, the temperature, pressure, free fatty acid content of the feed, and degree of mixing can change the amount of catalyst preferably employed. While specific catalyst amounts are discussed herein with reference to certain embodiments and examples, the preferred embodiments are not limited to such specific catalyst amounts. Other suitable catalyst amounts can also be employed in the preferred embodiments.

The esterification reaction can be performed batchwise, such as in a stirred tank, or it can be performed continuously, such as in a continuous stirred tank reactor (CSTR) or a plug flow reactor (PFR). When operated in continuous mode, a series of continuous reactors (including CSTRs, PFRs, or combinations thereof) can advantageously operate in series. Alternatively, batch reactors can be arranged in parallel and/or series.

When the reactor is operated in a continuous fashion, one or more of the feed materials is preferably metered into the process. Various techniques for metering can be employed (e.g., metering pumps, positive displacement pumps, control valves, flow meters, and the like). While specific types of reactors are discussed herein with reference to certain embodiments and examples, the preferred embodiments are not limited to such specific reactors. Other suitable types of reactors can also be employed in the preferred embodiments.

Electrodialysis

After the reaction step, the reaction mixture is subject to an electrodialysis step. This step removes at least a portion of the catalyst present in the reaction mixture, which results in suppression of esterification and/or transesterification reactions during subsequent separation steps as other components of the reaction mixture are removed. For example, if alcohol is removed prior to the removal of glycerol, the alkyl esters can recombine with the glycerol, reducing yields. Removal of the catalyst prior to removal of the alcohol can suppress this reverse reaction and lead to a cleaner separation of biodiesel material from the glycerol.

The reaction mixture is fed to the electrodialysis unit and is processed against a purge stream of alcohol. The unit can be operated continuously or in a batch mode. In other embodiments, an alcohol stream with catalyst can also be used as a purge stream.

The purge stream preferably contains no catalyst; however an inlet concentration (continuous operation) or starting concentration (batch operation) of approximately 2 wt. % or less catalyst is generally tolerable. High levels of catalyst in the purge stream decrease the efficiency of the electrodialysis; preferably the ratio of catalyst to alcohol in the purge stream is less than the ratio of catalyst to alcohol in the process stream; however, the electrical driving force of the electrodialysis process can support higher levels of catalyst in the purge stream than in the process stream. More preferably, the outlet catalyst to alcohol ratio (continuous) or final catalyst to alcohol ratio (batch) in the concentrate stream is maintained above the reactor mixture catalyst to alcohol ratio to support desired baseline alcohol to fatty acid stoichiometric ratios. Target concentrations are typically 4 wt. % or greater, more preferably 5 wt. % or greater but below 15 wt. % to minimize electrical energy consumption. These concentrations are preferred for achieving proper balance and control when recycling the recovered catalyst back to the process. If higher alcohol to fatty acid concentration are employed or if alcohol is extracted by distillation from the purge stream downstream of the electrodialysis process, lower catalyst to alcohol ratios can be employed, and thus higher efficiencies and less energy consumption can be achieved in the electrodialysis process.

A decrease in the concentration of catalyst in the reaction mixture can advantageously be obtained via the electrodialysis process. Removing 50 wt. % or more of the catalyst in the process stream is advantageous in decreasing downstream purification requirements. Preferably a decrease of 70 wt. % to 90 wt. % is obtained to inhibit reverse reactions. Most preferably, a decrease of greater than 99.9 wt. % is obtained to achieve a final product meeting specifications for use as biodiesel. Typically, the biodiesel reaction mixture has about 0.3 wt. % catalyst or 4 wt. % catalyst to alcohol. This corresponds to concentrations of approximately 15,000 to 20,000 ppm, but concentrations of 50,000 ppm can be acceptable in certain embodiments. The specification for biodiesel (B100) ASTM-6571-07b (available from ASTM, International, West Conshohocken, Pa.) in the United States sets the residual catalyst limit (sodium/potassium combined) at 5 ppm, and therefore typically 99.97 wt. % of the catalyst is removed to meet this specification. To achieve these targets, multiple electrodialysis units can be operated in series, higher overall active surface area in the electrodialysis units can be employed, the purge stream and process stream can be arranged in a counter-current flow direction, higher electrical potential can be applied, and/or other configurations adopted. Typically, the electrodialysis unit is operated at above 50° C. and more typically at temperatures and pressures that minimize the need for frequent temperature and pressure adjustments. The highest operating temperature of the unit is dependent on the stability of the cationic and anionic membranes used in the electrodialysis unit. The voltage is selected based on the terminal reactions desired at the electrodes and the overall voltage drop across the series of membranes. The current density is selected to achieve the target catalyst removal and dependent on the number of membranes between the electrodialysis unit's electrodes. The purge stream and process stream flow rates and velocities are set based on electrodialysis flow channel configurations and allowable pressure drops.

In certain embodiments, multiple electrodialysis units can operate in parallel or in series to achieve higher throughput or greater catalyst removal. When multiple units are operated in series, the purge stream and the process stream can flow in a counter-current flow direction to achieve an improved overall catalyst concentration gradient between the two streams. For example, the process stream can flow through the first unit to the second unit and to the third unit, while the purge stream can flow through the third unit to the second unit and to the first unit. Other configurations of multiple electrodialysis units can be employed, including those wherein the process stream flows in series through multiple units while the purge stream flows in parallel through all units.

Figure 2:
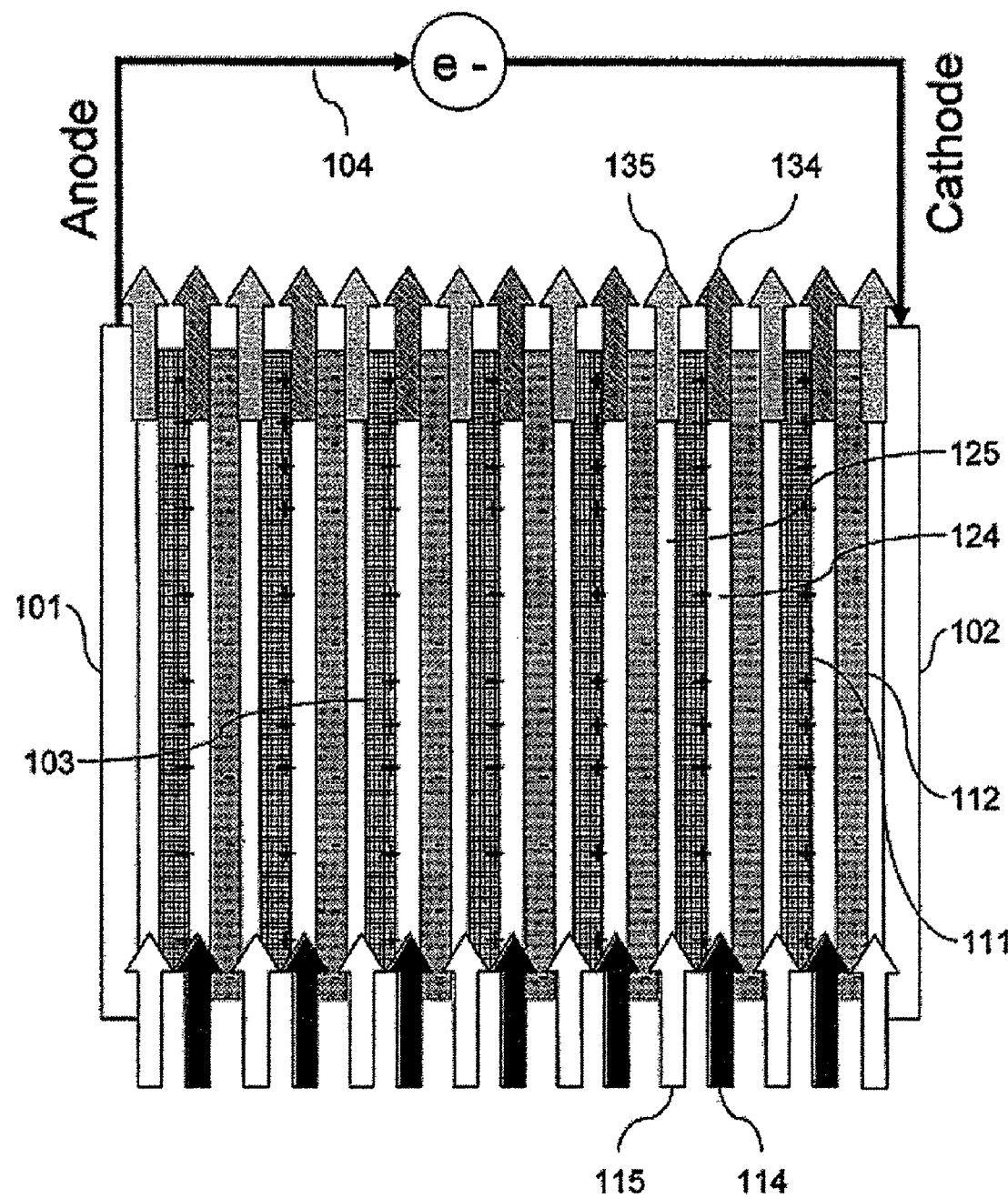
FIG. 2 is a schematic representation of the flow paths and an electrodialysis unit suitable for use in purification.

Any suitable electrodialysis unit can be employed, however it is particularly preferred to employ one having flow paths as depicted in FIG. 2. FIG. 2 is a schematic representation of the flow paths in an electrodialysis unit suitable for use in the preferred embodiments. Between anode 101 and cathode 102 are alternating cationic membranes 111 and anionic membranes 112. Between these membranes and between the membranes and anode and cathode are flow paths 124 for material which will lose catalyst, and flow paths 125 for the stream that will gain catalyst. Flow path 124 is fed with a process stream 114 containing a high level of catalyst in the alkyl ester and/or glycerol containing material and discharges a stream 134 at least partially depleted of catalyst. The low catalyst concentration purge stream 115 enters flow path 125 and exits as a higher concentration stream 135. An external electrical circuit 104 charges the anode 101 and cathode 102 by moving electrons from the anode to the cathode. In some embodiments, one or more flow paths next to an electrode can contain a different purge/concentrate stream than the other flow path chambers.

Figure 3:
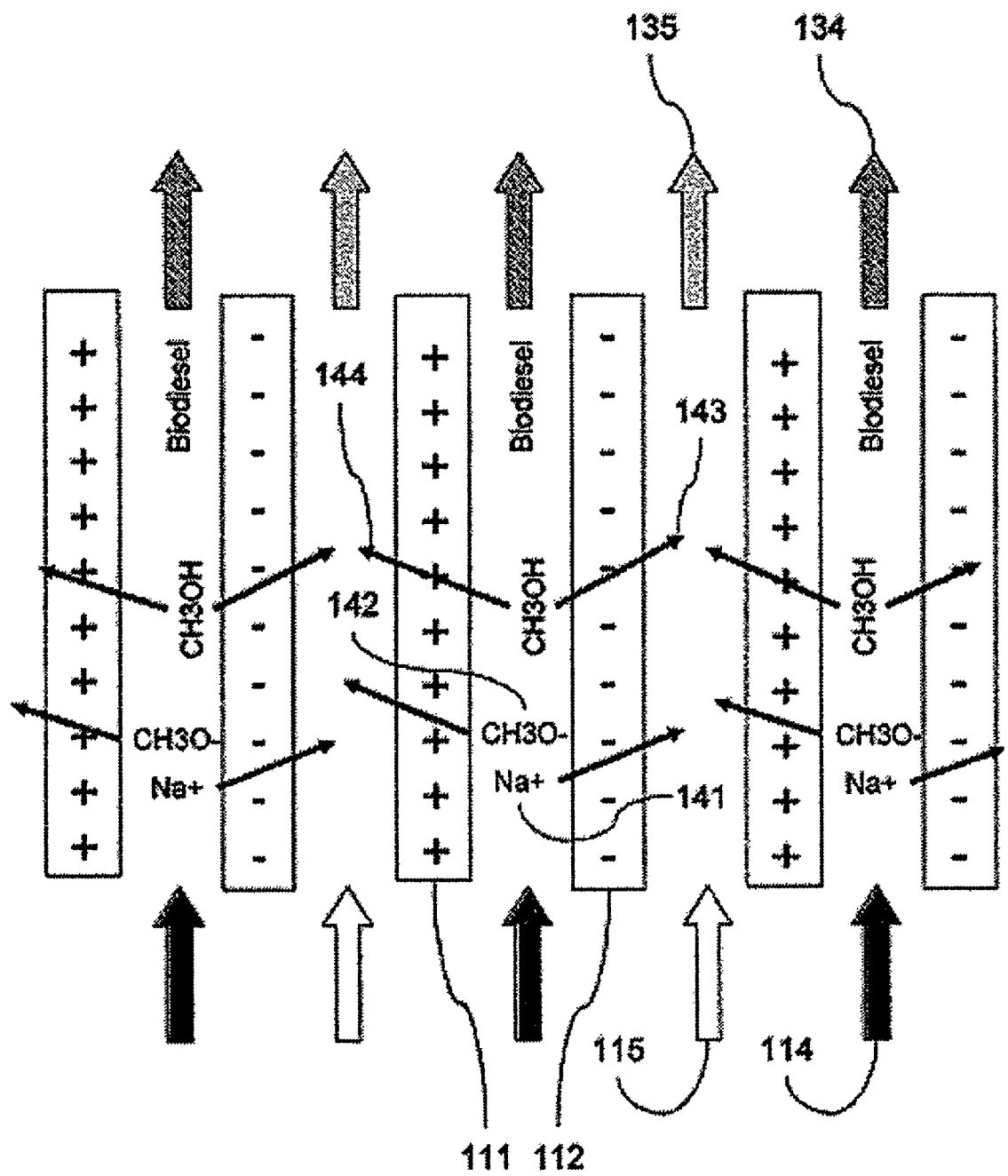
FIG. 3 is a schematic diagram showing the interaction of ions with the membranes and electrical field in the flow paths of an electrodialysis cell.

The interaction of the ions in the streams and flow paths is depicted schematically in FIG. 3. Here, ions in the process stream 114 are transferred through the membranes to the adjacent purge streams. The cations, such as $Na^+$ or $K^+$, move through the anionic membrane, toward the anode and the anions, such as methoxy or ethoxy ions move through the cationic membrane toward the cathode. Membranes employed in the electrodialysis unit include, e.g., styrene-divinyl benzene membranes made anionic with quaternary ammonium groups and made cationic with sulfonic groups, as well as other membranes as are known in the art.

Alcohol Separation

The depleted reaction mixture 42 from the electrodialysis step can be subjected to a separation step 50 to remove residual monohydric alcohol. The alcohol can be evaporated from the depleted reaction mixture 42 with any suitable device such as a flash tank, evaporator, distillation, column, or the like, in a batch or continuous mode of operation. The heat for evaporation can be supplied from the heat of the feed material, or through the use of heat exchange equipment. In some embodiments, the pressure can be decreased to facilitate evaporation. The alcohol concentration in the reaction mixture 42 is preferably 8 vol. %, but typically an amount of from about 5 vol. % to about 10 vol. %, or even as high as 50 vol. % can be employed, such as when a 15:1 alcohol to fatty acid ratio is employed. The final concentration of alcohol in the alcohol depleted material 51 is preferably less than 0.5 vol. %; however, concentrations as high as about 2 vol. % or more can also be acceptable in certain embodiments. Decreasing the alcohol concentration can facilitate the subsequent separation of glycerol from biodiesel material. When substantially higher alcohol concentrations than those that are particularly preferred are present, the separation of glycerol from biodiesel is more difficult, but at a concentration of about 8 vol. % separation occurs with typical residence times of from 2 hours to 24 hours. The presence of alcohol changes the solubility of one phase in the other. This results in potentially higher glycerol concentration in the alkyl ester phase and/or higher alkyl ester concentration in the glycerol phase. When alcohol dissolves into the heavier phase (glycerol), the density of the heavier phase is reduced. As a result, a gravity or density-based separation becomes more difficult due to the approaching densities of the two phases. The desired operating conditions of the alcohol removal stage are dependent on the effectiveness of the catalyst removal. If less than 50 wt. % of the catalyst is removed, sufficient catalyst remains to support reverse reaction, and therefore, the alcohol separation is preferably conducted after the separation step. If approximately 70 wt. % of the catalyst is removed, the temperature of the alcohol removal step is preferably decreased to approximately 50° C. and the pressure decreased. If approximately 90 wt. % or more catalyst is removed, the temperature of the alcohol removal step can be maintained at 65° C. to 70° C. or higher and the pressure can be ambient or decreased. The biodiesel specification ASTM-6751-07b defines the maximum methanol concentration at 0.2 vol. % and sets the flash point at 93° C. The higher the temperature and the lower the pressure of the alcohol separation step, the more effective is the removal of alcohol from the process stream.

Separation of Alcohol Depleted Material

The alcohol depleted material 51 is separated into a heavy phase 54 and a light phase 53, wherein the heavy phase includes glycerol and the light phase includes alkyl esters. The separation can be carried out in conventional density separation devices including but not limited to, settling tanks, gravity settlers, centrifuges, and hydrocyclones. Operating temperatures are preferably from about ambient or 30° C. to about 50° C.; however, higher or lower temperatures can be used as well. Separation is more effective at higher temperatures, longer resonance times, and under conditions of enhanced gravitational forces (such as can be applied by centrifuge). The ASTM-6751-07b specification sets the glycerol concentration in biodiesel at 0.02 wt. % for free glycerin and less than 0.24 wt. % for total glycerin, which includes mono-, di-, and triglycerides. To achieve these targets, additional purification steps are typically employed.

Purification of Separated Products

Additional purification steps can be performed on both the heavy phase 54 and the light phase 53. Such steps can include removal of solids, removal of water, removal of remaining catalyst, or removal of other impurities. Some steps are unique to one stream or the other, such as the removal of fatty acid esters from the heavy phase or removal of glycerol from the light phase. One measure of the degree of purification of the resulting alkyl ester material is the sulfated ash value, such as is determined according to ASTM D847.

Figure 4:
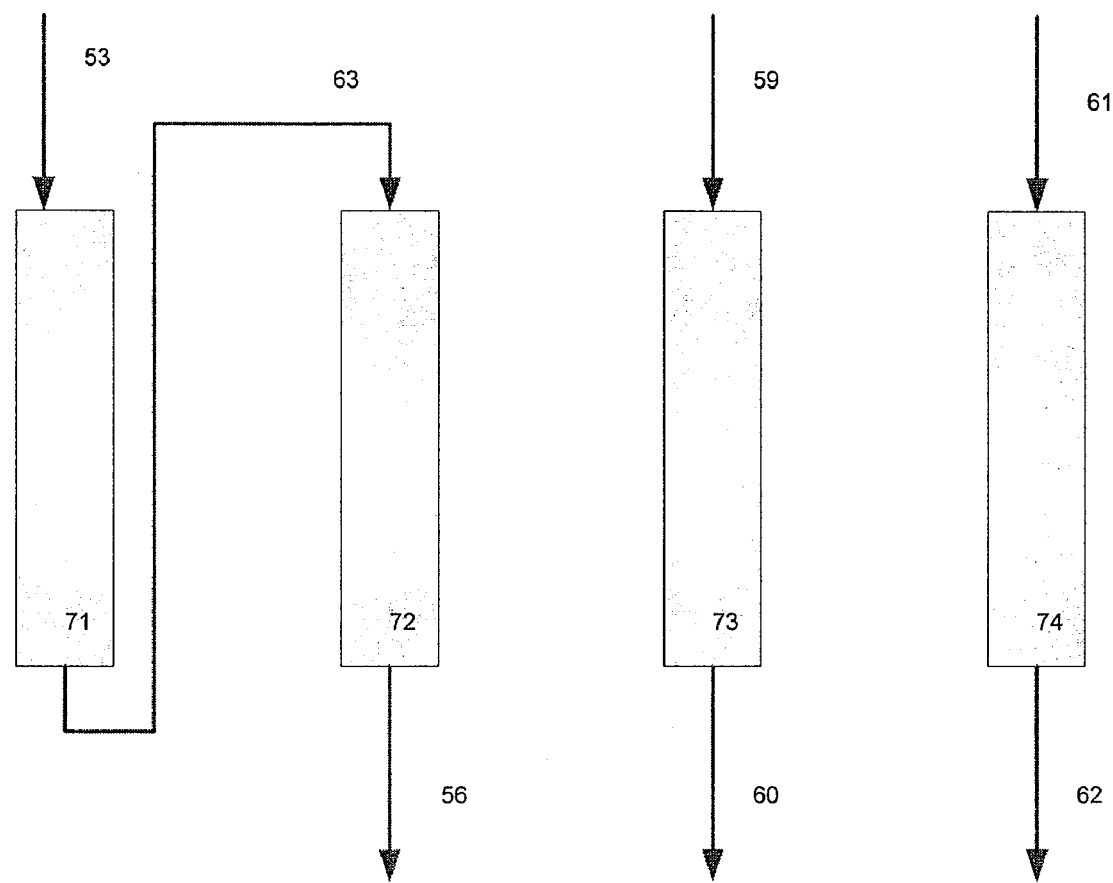
FIG. 4 is a block diagram illustrating a resin purification process for biodiesel containing material.

Purification of the light phase can include treatment with ion exchange resin to remove both the residual glycerol and catalyst, as shown schematically in FIG. 4. A light phase including biodiesel material 53 from separation step 59 in FIG. 1 is contacted with ion exchange resin in resin bed position 71 to remove residual catalyst and produce stream 63. Stream 63 is then contacted with ion exchange resin in resin bed position 72 to absorb residual glycerol and produce stream 56 of purified biodiesel material.

Regeneration of the resin beds can be accomplished by moving the bed in position 72 to position 73, and rinsing it with monohydric alcohol 59. The resulting rinsate 60 can then be reprocessed, recycled, or disposed of. The bed that was previously in position 73 is moved to position 74, where it is rinsed with biodiesel product 61. The biodiesel rinsate 62 can then be reprocessed, recycled or disposed of. The bed that was previously in position 74 is moved to position 72. Movement of the beds can be accomplished by physical relocation or by changing piping, valving, etc. to change the functional position of the beds.

When the catalyst adsorption capacity of the bed in position 71 for catalyst is exhausted, it is removed from service and replaced with the bed in position 72. A fresh catalyst bed is placed in position 73, the bed from position three is placed at position 74 and the bed from position 74 is placed at position 72. Alternatively, the bed in position 74 can be moved to position 71, the fresh bed placed in position 73 and the bed from position 73 placed at position 74. Other catalyst bed arrangements and shifting operations can be employed as suitable, as will be appreciated by one skilled in the art.

A resin suitable for use in this process is AMBERLITE BD10DRY® (Rohm & Haas, Philadelphia, Pa.). However, other resins can also be suitable for use, particularly those that are acidic cation exchange resins. Preferred resins include those that are strongly acidic, including those which have a sulfonic acid functional group ($R-SO_3^-$) and that are used in the $H^+$ form. Matrix materials include crosslinked polystyrene and styrene divinylbenzene. Suitable resins include those made/sold by Mitsubishi chemical Corp. (Tokyo, Japan), Rohm & Haas, EuroFuelTech (Orlando, Fla.) and Biodiesel Experts International LLC (Pearland, Tex.). Specific resins include Diaion® SK series resins, PK series resins, PR series resins, SK 1B, SK 102, SK 104, SK 106, SK 110, SK 112, SK 116, PK 208, PK 212, PK 216, PK 230, PR 228, Amberlite® CR series resins, IR series resins, IRN77, CR1310, CR1320, PuraBIO®, PuraBIO® PD206 and their equivalents. However, in some circumstances other resins such as weakly acidic cationic resins can be advantageously used. Variation in, for example, the amount of water, salt or catalyst present or when particular degrees of purification are desired can lead to other resin choices. Suitable weakly acidic cationic resins include, for example, those with carboxylic acid or other weak acid functional groups and those with crosslinked polymethacrylate or crosslinked polyacrylate matrices. Cycling between resin beds can be automatic or manual and can utilize inline sensors, sample analysis and timed sequencing. Sensors can employ sensing techniques including infrared (IR), refractive index (RI), gas chromatography, conductivity, and/or combinations thereof.

Glycerol Purification

Glycerol purification can be performed as desired based on, e.g., the byproduct market requirements. The techniques for glycerol purification are well known in the industry. (See, e.g., E. Jungermann and N. Sonntag, Glycerine: A Key Cosmetic Ingredient, New York, 1991). Glycerol is typically used as feedstock for boiler fuels, animal feed supplements, chemicals, soaps, cosmetic ingredients, pharmaceuticals, and other uses. Frequently, the crude glycerol mixture produced by the biodiesel process is processed off-site. The alcohol content in the crude glycerol mixture helps to maintain lower viscosity at ambient (e.g., 20° C.) to warm (e.g., 40° C.) temperatures, while alcohol free glycerol mixtures may need to be maintained at higher temperatures (80° C.) to maintain low viscosity such that the mixtures can be pumped. If the crude glycerol is used as an animal feed supplement, simple methanol extraction can be performed. Chemical feedstock markets typically employ catalyst neutralization and/or removal before processing, but these processes are typically performed at the user's site. Typically, glycerol is purified in a two or three stage distillation process to convert it into pharmaceutical grade material.

Process Modifications

Many modifications to the above process are expressly envisioned. In one embodiment, a second electrodialysis step is added for purification of the light phase 53. This electrodialysis step removes additional catalyst not removed with the first electrodialysis step 4. This additional electrodialysis step is conducted in a similar fashion as the first electrodialysis step, with the same concentrate stream composition and the same electrode stream composition.

Alternatively, an electrodialysis step can be employed to purify the heavy phase 54. This processing step removes additional catalyst from the heavy phase to make it more suitable for other uses, such as food or pharmaceutical applications. The operation of this electrodialysis step utilizes alcohol or water as the purge stream, and alcohol and water as the electrode stream. The operating conditions of temperature and flow configuration of the electrodialysis are similar to those identified in previous sections, except the operating temperature is high enough to keep the glycerol stream fluid or low in viscosity. If water is used as the purge stream, the water can also be added to the glycerol stream to decrease the viscosity.

Electrodialysis steps can also be employed on both streams 53 and 54, as described above. Alternatively, the first electrodialysis step 4 can be omitted and the reaction mixture 41 can go directly to the separation step 50.

Other embodiments of the process utilize pervaporation to remove alcohol from the alcohol depleted material 51, or the light phase 53, the purified biodiesel material 56, the heavy phase 54, the purified glycerol material 58, or combinations thereof.

One or more of the streams generated by the separation steps described above can be recycled in certain embodiments. The concentrate stream 36 from electrodialysis step 4 can be recycled to reaction step 2 as a source of alcohol and catalyst. Similarly the concentrate stream from the second electrodialysis step, described above as operating on the light phase 53, can be recycled in a similar fashion. When alcohol is used as the purge stream in a glycerol electrodialysis process, the concentrate stream can be recycled in a similar fashion. Additionally, the alcohol stream 52 from separation step 50 can be condensed and recycled to the reactor as a part of the alcohol feed 11. Alternatively, instead of recycling these streams, they can be collected and used for processing at a different time or place, such as for a different production batch, or for a different production line.

Various method of purifying the glycerol containing stream 54 can be employed including, but not limited to, electrodialysis, ion exchange, treatment with adsorption resin, treatment with activated carbon, treatment with other adsorbents (for example zeolites, activated carbon, etc.), distillation (including short path, molecular, centrifugal, low pressure, thin film, column, vacuum, high pressure, and moderate pressure), chromatography, filtration, centrifugation, treatment with membranes (including reverse osmosis, nanofiltration, microfiltration, pervaporation), and combinations thereof.

Figure 5:
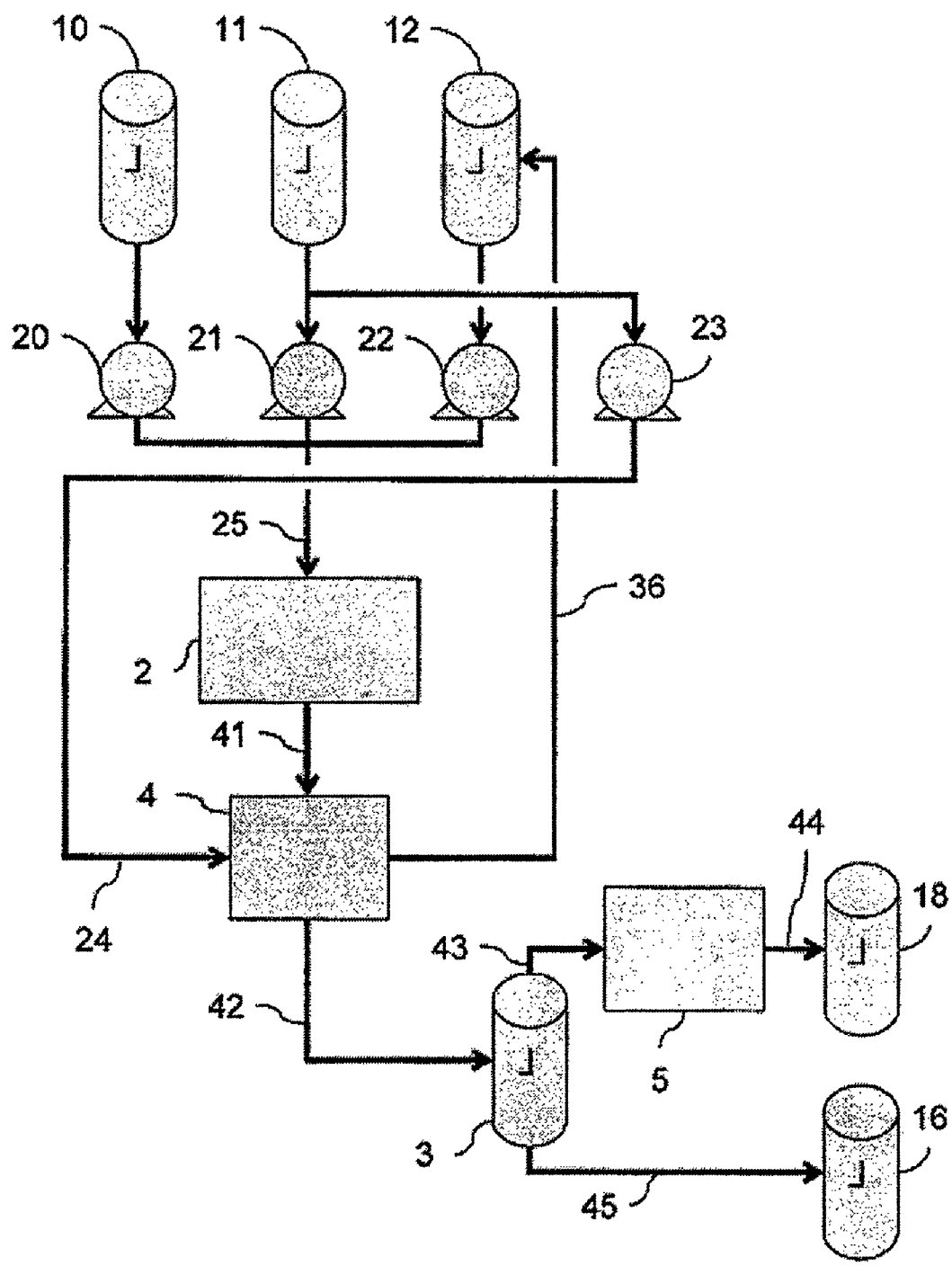
FIG. 5 is a schematic diagram illustrating a process for producing biodiesel product with an electrodialysis unit after an esterification step showing recycle of material from the electrodialysis unit.

Another preferred embodiment of the process is depicted schematically in FIG. 5. Feedstock oil is stored in tank 10, while alcohol is stored in tank 11 and catalyst in tank 12. Product alkyl ester, also known as biodiesel, is stored in tank 18 and byproduct glycerin is stored in tank 16. Feedstock oil, alcohol, and catalyst are pumped to the reactor feed 25 by pumps 20, 21, and 22, or delivered to reactor 2 by other appropriate methods. Alternatively, these reactor ingredients can be transferred directly to reactor 2 without mixing one or more of them. In reactor 2, triglycerides in the oil are transesterified with the added alcohol to produce alkyl esters.

The reactor 2 as illustrated in FIGS. 1 and 5-7, and as employed in other embodiments, can be a single stage, multistage, plug flow, or stirred tank reactor, and it can be operated batchwise or continuously.

The reaction mixture 41, including alkyl esters, catalyst, and glycerol, enters the electrodialysis unit 4 where at least a portion of the catalyst is removed. In some embodiments, at least a portion of the monohydric alcohol can also be extracted from the mixture.

Alcohol from tank 11 is pumped 23 as purge stream 24 to electrodialysis unit 4 where it collects the catalyst extracted from reaction mixture 41 and continues as concentrate stream 36 to catalyst tank 12. In other embodiments, a different source of alcohol can be employed, a different pump can be employed, the concentrate stream can be directed elsewhere, and/or the concentrate stream can be subjected to other processing, purification, and/or chemical addition or treatment steps.

After treatment in electrodialysis unit 4, the catalyst depleted stream 42 is fed to a separator 3 to separate a heavier phase 45 including glycerol in a lighter phase 43 including alkyl esters. This heavier phase 45 can be stored in one or more tanks 16, or further processed or utilized in any appropriate manner.

The lighter phase 43 can be further processed in purification unit 5. This purification unit can be a resin bed with a suitable resin, such as those that can absorb glycerin and/or adsorb catalyst. Suitable ion exchange resins include, but are not limited to, AMBERLITE BD10DRY® and other similar resins. In some situations, the purification unit can utilize a water wash system in which water and optionally a neutralizing agent, such as a weak acid, flows countercurrent to the biodiesel to remove glycerin and catalyst. The purified biodiesel 44 can then, e.g., be stored in tanks 18, packaged for sale, used directly, or used for other purposes.

Alcohol removal steps can optionally be performed on various streams. The excess alcohol present in any of the streams downstream of reactor 2, such as streams 41, 42, 43, 44, and 45, can be removed by techniques such as evaporation, distillation, preparation, and/or other methods as known in the art.

Figure 6:
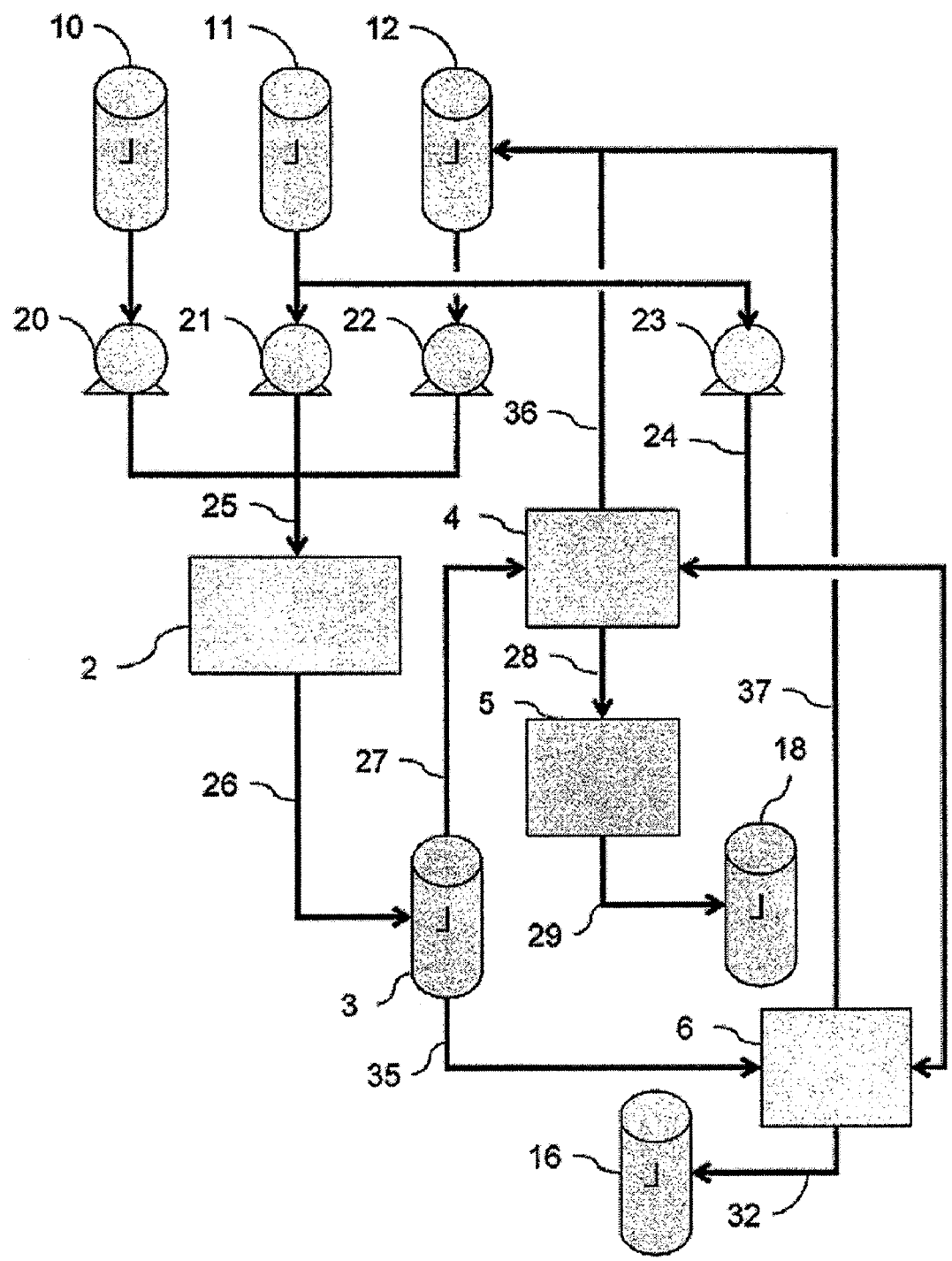
FIG. 6 is a schematic diagram illustrating a process for producing biodiesel material wherein a density separation step occurs prior to an electrodialysis step.

Another preferred embodiment of the process is depicted schematically in FIG. 6, wherein the biodiesel phase and the glycerol phase are treated independently, for example, when only the biodiesel phase is to be treated for catalyst removal, when the glycerol phase requires less catalyst removal, or when the effectiveness of the electrodialysis results in less than 50 wt. % removal of catalyst from the reactor mixture. In this embodiment, the reacted material 26 first enters a separator 3 and is separated into a light phase 27 including alkyl esters and a heavy phase 35 including glycerol. The light phase 27 is treated in an electrodialysis unit 4 where at least a portion of the catalyst is removed by an alcohol purge stream 24 to form a catalyst depleted stream 28 and a concentrate stream 36. The concentrate stream 36 is recycled or utilized in a fashion similar to stream 36 in FIG. 5. The catalyst depleted stream 28 can be further treated in a purification unit 5 to achieve the 5 ppm sodium/potassium biodiesel specification in a fashion similar to that described for stream 43 in FIG. 5, with the purified alkyl ester material/purified biodiesel stream 29 stored in tank 18 or otherwise further processed.

In some embodiments, as described above, multistage reactors can be employed. When multistage reactors are employed, glycerin can be removed between stages, such as by gravity separation, centrifugation, or other known techniques. When these separations are performed, they can be conducted after each of the reactor stages, or only after some reactor stages. Benefits of such separations can include improve yields and/or removal of water from the reacting mixture.

Optionally, the heavier phase 35 can be treated in a second electrodialysis unit 6 to remove catalyst and other ionic species to produce a purified glycerol stream 32 which is stored in tank 16 or employed for some other purpose. The electrodialysis unit 6, if employed, can be operated in a similar fashion to the electrodialysis unit 4, with an alcohol-containing purge stream 24 and concentrate stream 37 if the recovered catalyst is to be recycled, and aqueous purge and concentrate streams if the catalyst is not to be reused. Operational parameters for electrodialysis unit 6 may be somewhat different than for electrodialysis unit 4, e.g., flow rates, membrane area requirements, voltage, current, concentration, temperature and pressure may be slightly different because of the different process parameters, but these can be readily identified and adjusted for this different feed material.

Figure 7:
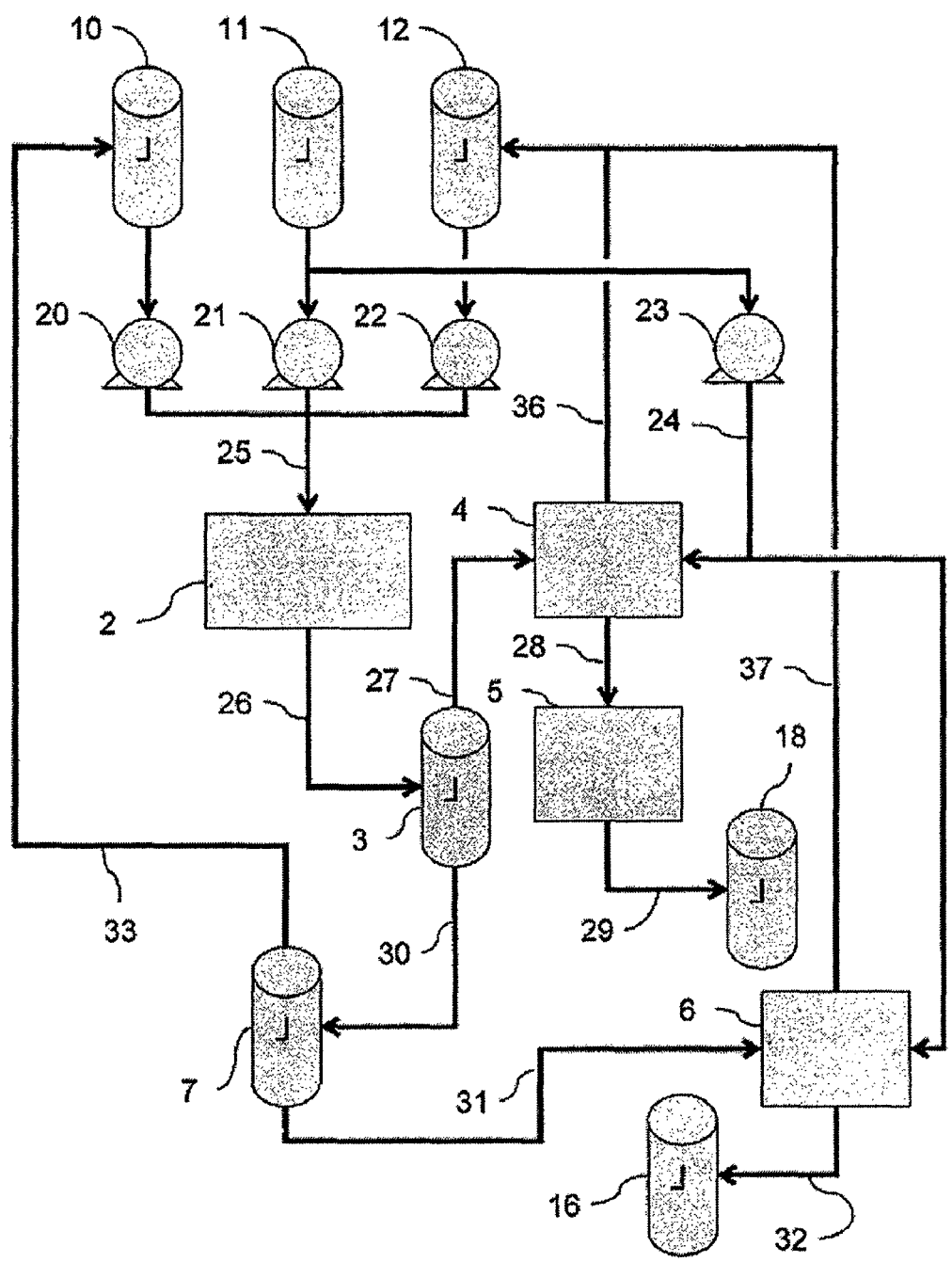
FIG. 7 is a schematic diagram illustrating a process for producing biodiesel material wherein multiple density separation steps precede an electrodialysis step.

Another embodiment is depicted schematically in FIG. 7. In this embodiment, the heavy phase 30, which can contain a higher than desired concentration of biodiesel because of shorter residence time in separator 3 or because of other reasons, is fed to a second stage separator 7 to further divide the stream into a second light phase 33 and a second heavy phase 31. Use of such a two stage separator can decrease residence time and lower the volume of the separators while achieving higher alkyl ester recovery efficiencies. The second light phase 33 is recycled to the reactor 2, such as via the oil feed tank 10, or employed for other uses. The second heavy phase 31 is processed in the second electrodialysis unit 6 in a similar fashion as described for the process depicted in FIG. 6.

In other embodiments, process monitoring and control techniques are employed in the transfer of materials to reactor 2. In one embodiment, the concentration of catalyst in catalyst feed tank 12 is measured and this measurement is employed to adjust the flow from the alcohol 11, feed oil 10, and catalyst 12 feed tanks. The measurement can be performed on a grab sample, or it can be performed on material while it is in the tank or in a unit attached to the tank. The measurement can also be done inline while the catalyst is transferred from catalyst tank 12 or inline on a combined stream from catalyst tank 12 and alcohol tank 11. Conductivity measurements or infrared and refractive index measurements can provide indications of the catalyst concentration or changes in the catalyst concentration in tank 12. The measured concentration or change in concentration can also be employed to adjust the relative flows of alcohol and catalyst solution to achieve a more constant ratio of oil:alcohol:catalyst. Typically, the alcohol to oil ratio is maintained at least at about 2:1 or higher, with higher levels not having a significant impact on the reactor operation. Catalyst concentrations of 0.5 wt. %+/−0.01 wt. % by weight of the total mass of material entering the reactor are typically preferred, which relates to a catalyst to alcohol concentration of about 2 to 4 wt. % by weight, depending on the number of reactor stages. Lower concentrations can result in lower oil conversion efficiencies and higher concentrations result in catalyst waste and increased cost of purification steps.

In one embodiment, the oil is fed at a constant rate to reaction step 2. The catalyst tank 12 is filled with a catalyst solution of up to 25 wt. % catalyst in alcohol solution and fed to the reaction step 2 along with alcohol 11 to achieve the desired alcohol and catalyst concentration in reaction step 2. When recycled catalyst 36 is returned to the tank at catalyst concentrations of greater than 4 wt. % but less than 25 wt. %, the concentration in the tank 12 is diluted with alcohol. When the concentration of catalyst in the reaction mixture decreases, the flow from the catalyst tank 12 can be increased and the flow of alcohol from tank 11 can be decreased to compensate. If the recycled catalyst 36 is returned to the tank at catalyst concentrations of from about 2 to 4 wt. %, and 100 wt. % of the catalysts is recycled, effectively all of the target alcohol is passed through the purge stream and the catalyst tank before the reactor. If the recycle catalyst 36 is returned to the tank at catalyst concentrations lower than about 2 wt. %, catalyst can be concentrated, such as by distillation, or the reactor can be operated at higher alcohol levels. When the concentration of catalyst increases, the flow from the catalyst tank can be decreased and the flow from the alcohol tank can be increased to compensate.

The measured concentration of catalyst can be employed in adjusting the concentration of catalyst. When the measured value is lower than a preset or desired value, the amount of alcohol from tank 11 can be decreased and the amount of material from catalyst tank 12 (which includes a mixture of alcohol and catalyst) can be increased. Alternatively, when the measured value is higher than a preset or desired value, the amount of alcohol from tank 11 can be increased and the amount of material from catalyst tank 12 can be decreased. The measured concentration can also be employed along with information on the rate and direction of change of the value to proactively adjust the flow of catalyst and/or alcohol and/or oil.

A flow meter can be employed to measure the flow rate and/or batch size of the material from the feed oil tank. The signal and/or display from the flow meter can be employed to adjust the flow rate or batch size of the feed oil to a set value. The adjustment can be accomplished by adjusting a valve, opening or closing a valve, starting or stopping a pump, adjusting the stroke length or frequency of a pump, or adjusting the speed of a pump. Adjustments can be made manually or automatically, and can occur periodically or continuously.

A controller can be used to make adjustments in process conditions. The controller can utilize proportional, integral, or derivative control algorithms or combinations of these such as proportional+integral or proportional+integral+derivative. Fuzzy logic, feed-forward techniques or combinations of these can be employed as well.

All references cited herein, including but not limited to published and unpublished applications, patents, and literature references, and also including but not limited to the references listed in the Appendix, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A method for producing a biodiesel material, the method comprising:
    conducting an esterification reaction by contacting a feed comprising at least one component selected from the group consisting of a fatty acid, a fatty acid derivative, and combinations thereof, with at least one monohydric alcohol in the presence of a homogeneous catalyst, whereby a reaction mixture comprising at least one ester of the fatty acid and the monohydric alcohol is obtained;
    subjecting at least a portion of the reaction mixture to a first electrodialysis step, whereby a stream rich in the homogeneous catalyst and a stream depleted in the homogeneous catalyst are obtained, wherein the stream depleted in the homogeneous catalyst is subjected to further processing to yield a biodiesel material; and
    recycling at least a portion of the stream rich in the homogeneous catalyst to the esterification reaction.

2. The method of claim 1, wherein the fatty acid derivative is a soap.

3. The method of claim 1, wherein the feed comprises an ester of at least one fatty acid and glycerin.

4. The method of claim 1, wherein the feed comprises at least one free fatty acid.

5. The method of claim 1, wherein the monohydric alcohol is a $C_{1-6}$ monohydric alcohol.

6. The method of claim 1, wherein the homogeneous catalyst is a basic homogeneous catalyst.

7. The method of claim 1, wherein the homogeneous catalyst is an acidic homogeneous catalyst.

8. The method of claim 1, further comprising a step of removing from the stream depleted in the homogeneous catalyst at least a portion of the monohydric alcohol present, whereby a stream depleted in homogeneous catalyst and monohydric alcohol is obtained.

9. The method of claim 8, wherein the step of removing from the stream depleted in the homogeneous catalyst at least a portion of the monohydric alcohol present is conducted if a weight ratio of homogeneous catalyst in the stream depleted in the homogeneous catalyst to homogeneous catalyst in the reaction mixture is less than or equal to about 30 wt. %.

10. The method of claim 8, wherein at least a portion of the alcohol is removed by evaporation.

11. The method of claim 8, wherein the stream depleted in homogeneous catalyst and monohydric alcohol comprises glycerol and monoalkyl ester, the method further comprising:
    separating the stream depleted in homogeneous catalyst and monohydric alcohol into a phase rich in glycerol and a phase depleted in glycerol; and
    subjecting the phase depleted in glycerol to a purification step, whereby a purified stream comprising at least one monoalkyl ester is obtained.

12. The method of claim 11, wherein the purification step comprises a second electrodialysis step followed by an ionic exchange resin treatment step.

13. The method of claim 12, wherein the ionic exchange resin treatment step is conducted in an ionic exchange resin bed.

14. The method of claim 11, wherein the purification step comprises a water-wash process.

15. The method of claim 1, wherein the stream depleted in homogeneous catalyst and monohydric alcohol comprises glycerol and monoalkyl ester, the method further comprising separating the stream depleted in the homogeneous catalyst into a phase rich in glycerol and a phase depleted in glycerol.

16. The method of claim 15, wherein the step of separating the stream depleted in the homogeneous catalyst into a phase rich in glycerol and a phase depleted in glycerol is conducted if a weight ratio of homogeneous catalyst in the stream depleted in the homogeneous catalyst to homogeneous catalyst in the reaction mixture is more than or equal to about 10 wt. %.

17. The method of claim 15, wherein separating is by density.

18. The method of claim 15, further comprising subjecting the phase depleted in glycerol to a purification step, whereby a purified stream comprising at least one monoalkyl ester is obtained.

19. The method of claim 18, wherein the purification step comprises a second electrodialysis step followed by an ionic exchange resin purification step and an alcohol removal step.

20. The method of claim 19, wherein the ionic exchange resin purification step is conducted in an ionic exchange resin bed, and wherein the alcohol removal step follows the ionic exchange resin purification step.

21. The method of claim 18, wherein the purification step comprises an alcohol removal step followed by a water-wash process.

22. The method of claim 1, wherein the reacted mixture comprises glycerol, further comprising separating the reaction mixture comprising at least one ester of the fatty acid and the monohydric alcohol into a portion rich in glycerol and a portion depleted in glycerol, and subjecting the portion depleted in glycerol to the first electrodialysis step.

23. The method of claim 22, wherein separating is by density.

24. The method of claim 23, further comprising subjecting the stream depleted in homogeneous catalyst to a purification step, whereby a purified stream comprising at least one monoalkyl ester is obtained.

25. The method of claim 24, wherein the purification step comprises exposure to an ionic exchange resin bed followed by an alcohol removal step.

26. The method of claim 24, wherein the purification step comprises an alcohol removal step followed by a water-wash process.

27. The method of claim 12, wherein the ion exchange resin comprises a hydrogen form cationic resin.

28. The method of claim 11, wherein the purified stream comprising at least one monoalkyl ester contains at least about 98 wt. % monoalkyl ester.

29. The method of claim 18, wherein the purified stream comprising at least one monoalkyl ester contains at least about 98 wt. % monoalkyl ester.

30. The method of claim 24, wherein the purified stream comprising at least one monoalkyl ester contains at least about 98 wt. % monoalkyl ester.

31. The method of claim 11, wherein the purified stream comprising at least one monoalkyl ester contains less than about 1 wt. % glycerol and less than about 0.5 wt. % sulfated ash as determined by ASTM D874.

32. The method of claim 18, wherein the purified stream comprising at least one monoalkyl ester contains less than about 1 wt. % glycerol and less than about 0.5 wt. % sulfated ash as determined by ASTM D874.

33. The method of claim 24, wherein the purified stream comprising at least one monoalkyl ester contains less than about 1 wt. % glycerol and less than about 0.5 wt. % sulfated ash as determined by ASTM D874.

* * * * *